US009160472B2

(12) United States Patent
Chandhoke et al.

(10) Patent No.: US 9,160,472 B2
(45) Date of Patent: Oct. 13, 2015

(54) CLOCK SYNCHRONIZATION OVER A SWITCHED FABRIC

(75) Inventors: Sundeep Chandhoke, Austin, TX (US); Rodney D. Greenstreet, Leander, TX (US)

(73) Assignee: National Instruments Corporation, Austin, TX (US)

( * ) Notice: Subject to any disclaimer, the term of this patent is extended or adjusted under 35 U.S.C. 154(b) by 132 days.

(21) Appl. No.: 13/606,293

(22) Filed: Sep. 7, 2012

(65) Prior Publication Data

US 2014/0071982 A1    Mar. 13, 2014

(51) Int. Cl.
*H04J 3/06* (2006.01)
*G06F 1/14* (2006.01)
*G05B 19/042* (2006.01)

(52) U.S. Cl.
CPC .............. *H04J 3/0667* (2013.01); *G05B 19/042* (2013.01); *G06F 1/14* (2013.01); *H04J 3/06* (2013.01); *H04J 3/0673* (2013.01)

(58) Field of Classification Search
CPC ............ H04W 72/042; H04W 72/0406; H04J 3/0673
See application file for complete search history.

(56) References Cited

U.S. PATENT DOCUMENTS

| | | | |
|---|---|---|---|
| 2004/0230861 A1* | 11/2004 | Bailey et al. | 714/6 |
| 2008/0072309 A1 | 3/2008 | Kleinsteiber et al. | |
| 2008/0192920 A1* | 8/2008 | Bhusri | 379/229 |
| 2008/0243950 A1 | 10/2008 | Webman et al. | |
| 2010/0054244 A1* | 3/2010 | Tamura | 370/389 |
| 2013/0089170 A1* | 4/2013 | Chiesa et al. | 375/356 |

OTHER PUBLICATIONS

Jason W. Bacon, Computer Science 315 Lecture Notes §14.3 "Memory-Mapped I/O", http://www.cs.uwm.edu/classes/cs315/Bacon/Lecture/HTML/ch14s03.html, University of Wisconsin at Milwaukee, 2010.*
Lin, Charles C., Lecture Note for CMSC 311, "Memory-Mapped I/O", http://www.cs.umd.edu/class/sum2003/cmsc311/Notes/IO/mapped.html, University of Maryland, 2003.*

* cited by examiner

*Primary Examiner* — Khaled Kassim
*Assistant Examiner* — Zhaohui Yang
(74) *Attorney, Agent, or Firm* — Meyertons Hood Kivlin Kowert & Goetzel, P.C.; Jeffrey C. Hood; Michael B. Davis

(57) ABSTRACT

Devices and methods for synchronizing devices over a switched fabric. A master device maintains a global time, determines a mapping between the global time and a counter of a switch over a memory-mapped fabric, and sends the mapping to a slave device. A slave device maintains a local time, determines a first mapping between the local time and a counter of a switch, receives a second mapping between the counter and a global time of the master device, and synchronizes its local time to the global time based on the first and second mappings. The master and slave device may map their times to the counter by sending respective request packets to the switch and receiving respective completion packets including respective counter values from the switch. The master and slave device may determine respective time values corresponding to the respective counter values based on in-switch delays of the packets.

22 Claims, 12 Drawing Sheets

CLOCK SYNCHRONIZATION OVER A SWITCHED FABRIC

FIELD OF THE INVENTION

The present invention relates to the field of networked devices, and, more particularly, to time synchronization over a switched fabric.

DESCRIPTION OF THE RELATED ART

In distributed computing systems utilizing switched fabrics, it is often desirable to discipline clocks of various devices to synchronize with a reference clock or "global" clock of a reference device or "master" device. Synchronizing device clocks to a master time may be difficult over a switched fabric because of traffic congestion and buffering of transactions in switches. Further, synchronization of devices in different fabric domains may be difficult.

For example, Peripheral Component Interconnect (PCI)-Express (PCIe) was originally conceived as a distributed-clock architecture. A common system clock is distributed to all PCI-Express devices in the system to allow all components in the systems to communicate coherently at gigahertz bit rates while taking advantage of spread-spectrum clocking technology to reduce the peak radiated emissions profile to meet the requirements of various regulatory bodies.

Distributed computing is gaining in popularity, and some switched fabric specifications, e.g., PCI-Express specifications, allow cabled interconnects. Therefore, individual devices, e.g., PCI-Express devices, may include their own clock which should be synchronized to a master clock. Also, because of cabled interconnects, there is a need to allow multiple processors to connect to each other over the fabric, e.g., using PCI-Express. Such implementations require the use of clock domain crossing to allow portions of the system that use the fabric, e.g., PCI-Express, to operate using independent clocks. One example of this would be two independent systems linked via a Non-Transparent Bridge (NTB). In this configuration, the two systems do not share a single clock, but need to transfer data over the fabric, e.g., over a PCI-Express interface, and allow spread-spectrum clocking.

Thus, improved systems and methods for clock synchronization over a switched fabric are desired, including synchronization over different clock domains.

SUMMARY OF THE INVENTION

Various embodiments of devices, systems, and methods for clock synchronization between multiple clock domains over a switched fabric are presented below.

A distributed system may include a master device, a switch, and a slave device, coupled via a memory-mapped, switched fabric. The memory-mapped, switched fabric may be a PCIe fabric, for example. The master and slave device may reside in different time domains. The master device and slave device may map their respective times to a counter of the switch and the master device may send its mapping to the slave device. The slave device may synchronize its local time to a global time of the master device based on the mappings. The switch and one or more other switches may determine and indicate respective in-switch delays of packets relevant to the mappings.

A master device may be configured to maintain a global time, determine a mapping between the global time and a counter of a switch over a memory-mapped fabric, and send the mapping to a slave device. In one embodiment, the master device determines the mapping by sending a request packet to the switch, receiving a completion packet from the switch, and determining a global time value corresponding to the counter value. In one embodiment, the master device determines the global time value based a sending time corresponding to sending the request packet, a completion time corresponding to receiving the completion packet, and in-switch delays of the request packet and in-switch delays of the completion packet. In one embodiment, the request packet and completion packet include one or more transaction delay fields for storing accumulated in-switch delays of the packets. In another embodiment, the switch and one or more other switches store in-switch delays in local storage elements.

A slave device may be configured to maintain a local time, determine a first mapping between the local time and a counter of a switch over a memory-mapped fabric, receive a second mapping between the counter and a global time from a master device, and synchronize the local time to the global time based on the first and second mappings. In some embodiments, the slave device is configured to map its local time to the counter in a similar manner to the master device's mapping the global time to the counter as described above, including sending a request packet, receiving a completion packet, and determining a local time value based in part on in-switch delays.

The master device and the slave device may reside in different clock domains and/or different address spaces. The master and slave devices may be separated by a non-transparent bridge.

Devices and methods according to the present disclosure may allow more accurate time synchronization between devices over a memory-mapped, switched fabric that includes multiple clock domains and/or non-transparent bridges.

BRIEF DESCRIPTION OF THE DRAWINGS

A better understanding of the present invention can be obtained when the following detailed description of the preferred embodiment is considered in conjunction with the following drawings, in which.

Figure 1A:
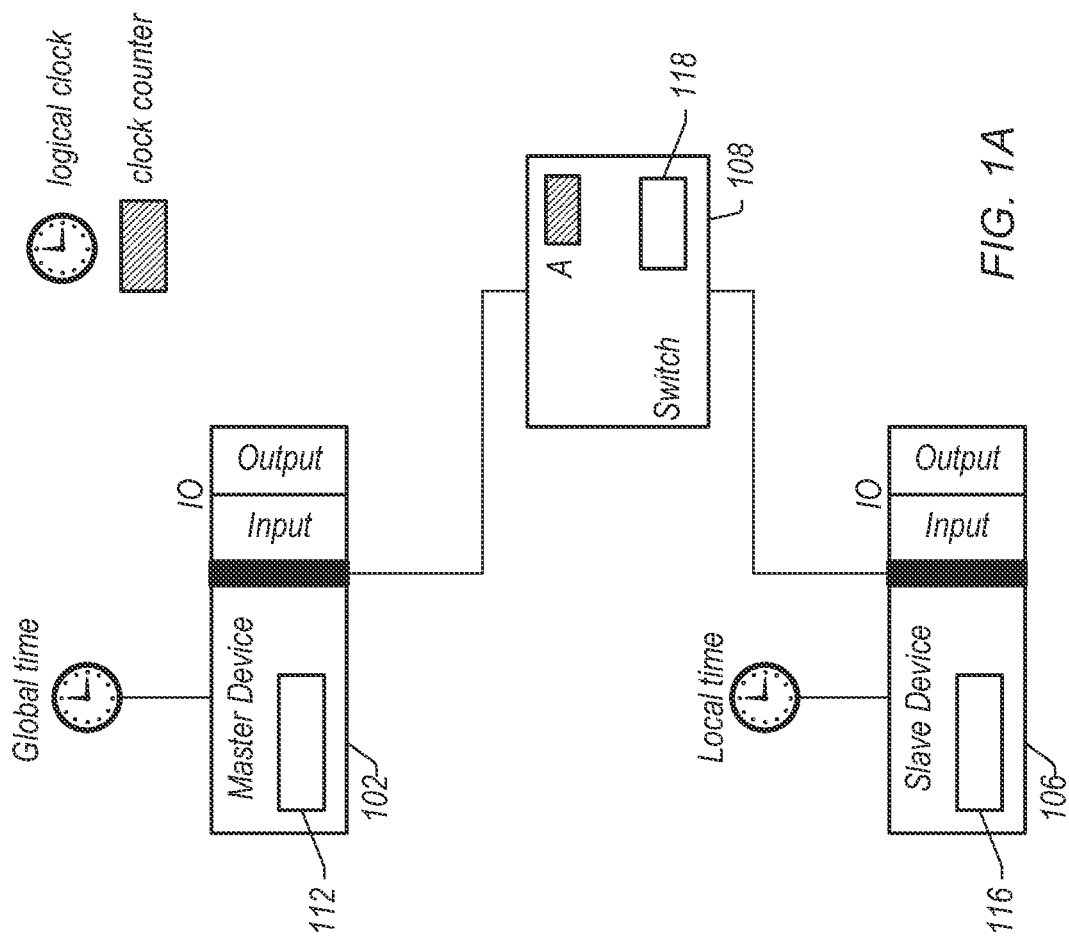
FIG. 1A is a block diagram illustrating an exemplary distributed system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Physical Diagram—A diagram which visually indicates physical connectivity between physical devices. For example, a physical diagram may visually indicate the connectivity of various physical components in a measurement system, e.g., a computer connected to a measurement device via an Ethernet network. Thus the wires in a physical diagram represent physical connectivity between devices. A physical diagram may show the corresponding "real world" physical system/devices.

Configuration Diagram—A diagram which indicates connectivity between real and/or virtual devices. A configuration diagram may visually indicate physical connectivity between physical devices as shown in a physical diagram. However, in some embodiments, one or more of the devices (or all of the devices) in the configuration diagram may be virtual or simulated devices. Thus, some or all of the devices in the configuration diagram may not be physically present in the system represented by the configuration diagram.

System Diagram—A diagram with one or more device icons and graphical program code, wherein the device icons are used to specify and/or visually indicate where different portions of graphical program code are deployed/executed. A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons, or that express or specify a connection or relationship between the icons (or entities represented by the icons). Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Data Flow Wire—a graphical element displayed in a diagram on a display that connects icons or nodes in the diagram and denoting that data is exchanged between the two icons or nodes.

Isochronous Data Flow Wire—a graphical element displayed in a diagram on a display that connects icons or nodes in the diagram, which denotes that data is exchanged between the two entities and that further denotes and constrains the exchange of data to occur periodically, at a fixed rate that remains constant over time. The data exchange path or transmission media (e.g., PCI bus) may be managed such that it is available to exchange the data at the appointed time, thus guaranteeing bandwidth for the transfer, and providing an upper bound for the data's arrival time (transfer latency).

Clock Disciplining Wire—a graphical element displayed in a diagram on a display that connects two clocks in a clock hierarchy, and that establishes a master/slave relationship between the two clocks.

Timed Invocation Wire—a graphical element displayed in a diagram on a display that connects two nodes or icons, where a first node or icon invokes (causes execution of) a second node or icon connected by the timed invocation wire to the first node or icon. The first node or icon determines the execution rate of the second node or icon by communicating the execution rate to the second node or icon via the timed invocation wire, or, alternatively, by sending invocation commands (or events) to the second node or icon via the timed invocation wire or by some other mechanism.

Timing Wire—a graphical element displayed in a diagram on a display that connects two entities (e.g., nodes or icons), and that implies a timing relationship between them. The timing relationship may be any of a master/slave clock disciplining relationship or an invocation timing relationship.

Invocation Timing Relationship—a relationship in which a first node or icon is connected to a second node or icon by a timed invocation wire where the execution rate of the second node or icon is controlled by the first node or icon.

Execution Rate—the number of invocations per unit time of an entity.

Execution Offset—a delay in the execution of one node or icon with respect to execution of another node or icon, where, e.g., a first node or icon is connected to a second node or icon by a timed invocation wire where the execution rate of the second node or icon is controlled by the first node or icon. The moment of execution of the second node or icon may be configured to be delayed (or offset) from the time strictly determined by the first node or icon.

Timing Generator—a node on a graphical diagram that is the source of timed invocation wires.

Timing Diagram—a graphical diagram depicting the master/slave relationships and invocation timing relationships of all the entities (e.g., nodes or icons) in a system.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Configurable Elements—Systems or devices that provide configurable functionality but do not themselves includes processors that process data. Configurable elements may produce and/or consume data that may be provided to or received from various processing elements. A configurable element may have or receive configuration data that specifies functionality of the configurable element. Configurable elements comprise data acquisition (DAQ) devices and/or other sensors/devices.

Clock—a periodic signal, e.g., as in a two valued (binary) electrical signal; an entity that can be queried for a time stamp.

Time stamp—a data representation of time; an indication of when a record was generated or acquired, e.g., in terms of a tick count of a clock, a single unit of time, e.g., seconds, a multi-unit instant in time, e.g., year:month:day:hours:minutes:seconds:sub-seconds.

Clock Hierarchy—a collection of two or more clocks that share in a synchronization scheme such that all the clocks in the hierarchy agree on the time, where one clock operates as master clock and the others operate as slaves. The synchronization scheme may insure that all the periodic binary electrical signals in the hierarchy have a fixed phase relationship, and that all clocks return equal valued time stamps when queried at the same instant.

Phase Relationship—the relative time between like changes in value of two or more binary electrical signals. The phase relationship is 'fixed' when the relative time of these like value changes between the signals is constant over the life of the signals.

Clock Symbol—a node on a graphical diagram that represents a clock.

Master Clock—a first clock in a clock hierarchy with which the remaining clocks in the hierarchy must agree.

Slave Clock—a second clock in a clock hierarchy whose timing is forced to agree with a first clock in the clock hierarchy where the first clock is called the master clock.

Master/Slave Relationship—a first clock in a clock hierarchy forces a second clock in the clock hierarchy to agree with the first clock, including maintaining a fixed phase relationship between first and second binary valued electrical signals, and time stamp equivalency for simultaneous first and second clock time stamp queries. The first clock is the master in this relationship between the two clocks, and the second clock is the slave in this relationship.

Embodiments of a system and method for clock synchronization between different clock domains over a switched fabric are described below. It should be noted that while some of the embodiments disclosed herein are described in terms of devices with processors, e.g., controllers, coupled over a PCIe switched fabric, it should be noted that the techniques disclosed herein are broadly applicable to devices with or without processors or other functional units, coupled via a switched fabric (but not necessarily a PCIe switched fabric).

As used herein, the term "functional unit" refers to a processor and memory, a programmable hardware element, e.g., a field programmable gate array (FPGA), or a combination of both. Further, as used herein, the term "controller" refers to a computing device that couples to one or more other devices, e.g., peripheral devices, motion drives, actuators, etc., and which may be configured to communicate with, e.g., to control, such devices. Still further, as used herein, the term "processing element" refers to a processor, a portion of a processor, a system including multiple processors, a circuit (e.g., a circuit that is a portion of a processor), or an FPGA.

For example, in one embodiment, the controllers may be embedded devices, e.g., in a distributed control system, e.g., a distributed motion control system. As used herein, the term "embedded device" refers to a small platform which includes dedicated hardware, and which includes a processor and memory (or FPGA) on which may be installed dedicated programs or software. An embedded device is typically designed to perform a defined task very well. In particular, an embedded device is typically not a device with general capabilities, such as a PC or PXI controller, for example, loaded with one or several plug-in boards, running a Microsoft OS with generous amounts of memory, system files, utilities, etc, that can be used as a measurement system, or as an office computer, or as a Web browser, etc. Thus, for example, an embedded controller may not include display capabilities typical of home computers or workstations. In some embodiments, the embedded controllers may be accessible, e.g., for monitoring or configuring, via a temporary interface, e.g., via connecting the controllers to a host computer which provides GUI functionality. Alternatively, in some embodiments, the controllers may be accessed via a web interface utilizing a web browser. Of course, any other means for interfacing with the controllers may be used as desired.

Figure 1B:
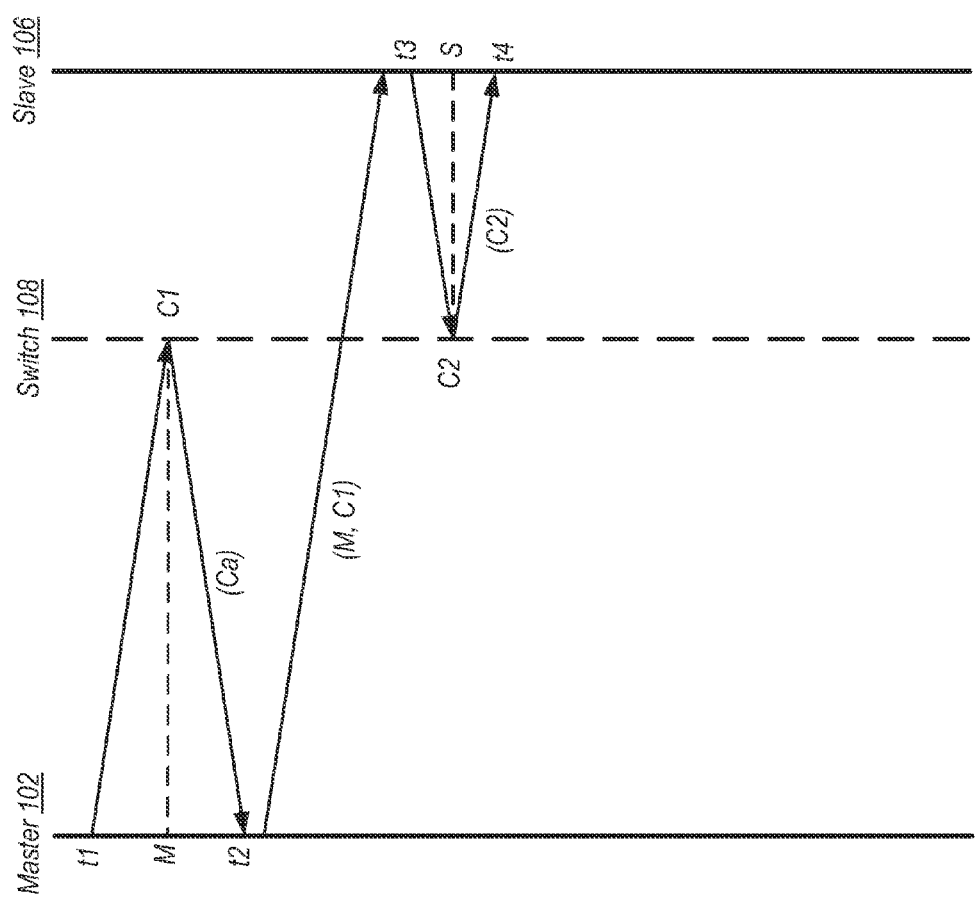
FIG. 1B is a diagram illustrating exemplary mapping of device times to a switch counter.
Figure 2A:
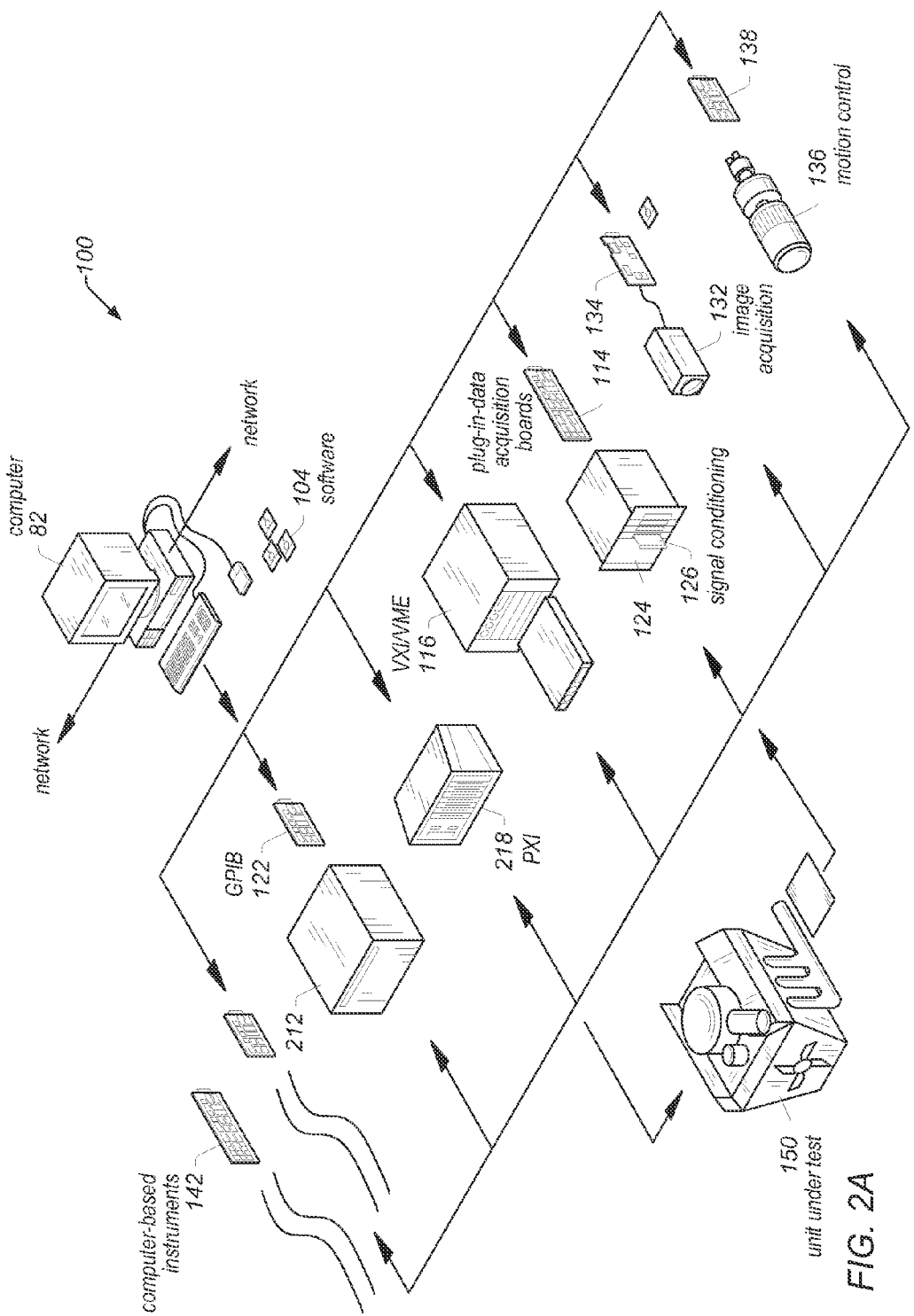
FIG. 2A illustrates an instrumentation control system according to one embodiment of the invention.
Figure 2B:
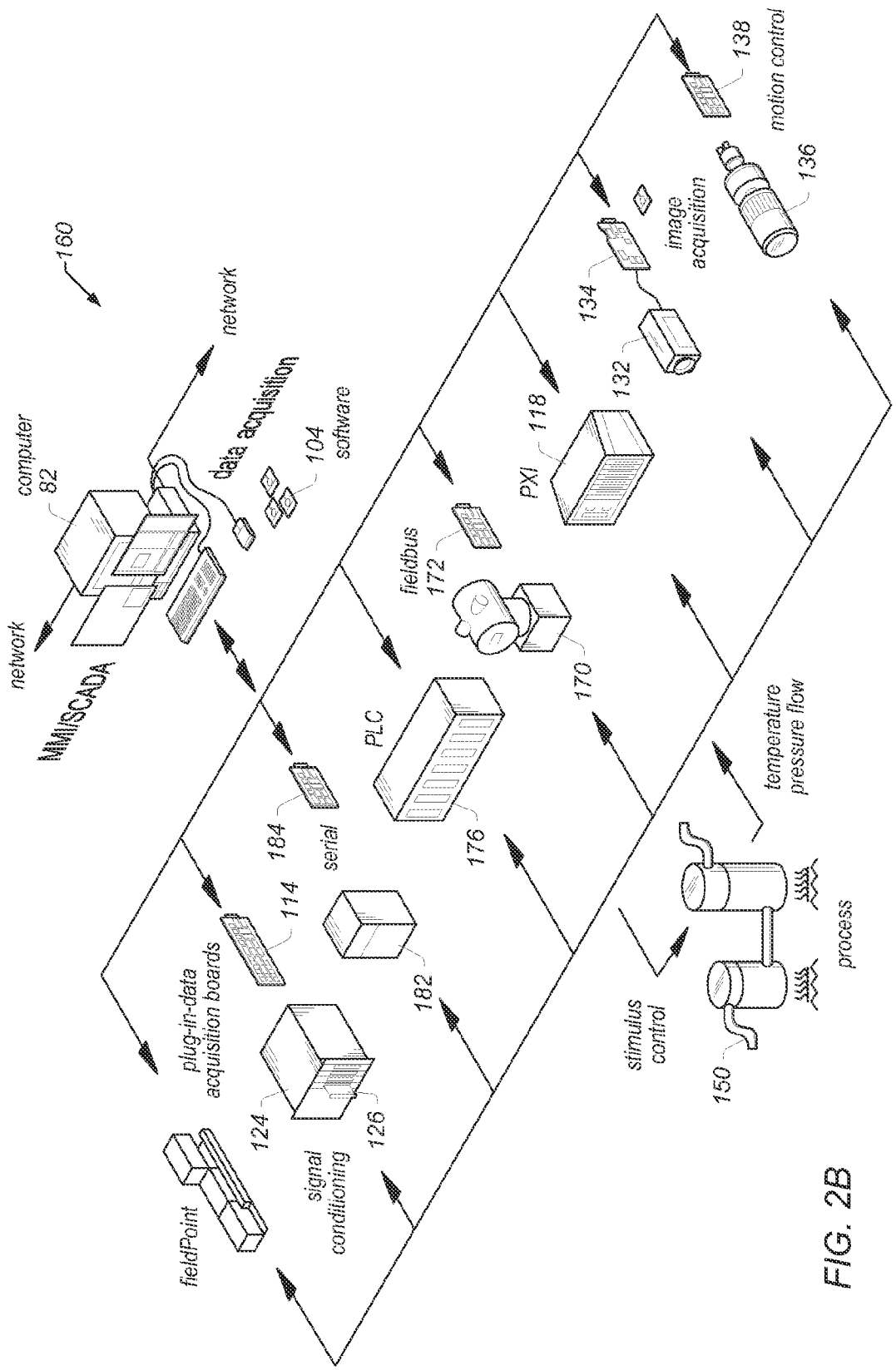
FIG. 2B illustrates an industrial automation system according to one embodiment of the invention.

In other embodiments, the industrial controllers may be or include personal computers or workstations, as illustrated in FIGS. 1, 2A, and 2B.

Time Synchronization Overview

As indicated above, synchronizing devices in a distributed system that includes or spans multiple clock domains (i.e. time domains) can be problematic. Generally, synchronized distributed systems include one device, referred to as the master device, which is used to provide a reference clock or "global clock," and one or more other devices, referred to as slave devices, slave to it, i.e. discipline their (logical) local clocks to the global clock. The terms "global" and "local" are not intended to imply physical or configuration differences between clocks, but refer to a relationship between clocks in a synchronization methodology: one or more local clocks are synchronized (i.e. disciplined/slaved) to a global clock. It should be noted that in applications where devices in such a distributed system time stamp data, e.g., as part of a data acquisition (DAQ) or data generation process, proper time stamping of data in accordance with the master clock by devices in different clock domains may also be considered "synchronization," although this is a slightly different meaning from the term's typical use in industrial or other commercial applications.

Referring to FIG. 1A, master device 102 is coupled to slave device 106 via a memory-mapped, switched fabric that includes switch 108. Master device 102 is configured to maintain a global time, e.g., using its logical clock. Slave device 106 is configured to maintain a local time, e.g., using its logical clock. Slave device 106 may be configured to synchronize its local time with the global time of master device 102. Switch 108 includes counter A. In various embodiments, counter A may be incremented based on a clock of the domain of master device 102, a clock of the domain of slave device 106, or some other clock.

Note that as used herein the term "logical clock" refers to a software or hardware implantation of a clock that is derived from a physical clock, e.g., a local physical clock on a device, and which can be "disciplined" to, i.e., forced to match, the reference or global clock.

Further, as used herein, the term "coupled to" may indicate one or more connections between elements, and a coupling may include intervening elements. For example, in FIG. 1A, master device 102 may be described as "coupled to" slave device 106 via switch 108 and a memory-mapped fabric. In contrast, in the illustrated embodiment of FIG. 1A, master device 102 is "directly coupled" to switch 108 because there are no intervening elements.

Still further, as used here, the term "memory-mapped" refers to a methodology where devices are mapped to (i.e. associated with) address values. Thus, a first device may read/write from/to a memory of a second device using a memory-mapped methodology where the memory of the second device is mapped to a set of address values that the first device reads from or writes to. A "memory-mapped fabric"

refers to a fabric that facilitates communication between devices using a memory-mapped methodology. For example, a particular device is configured to detect and process packets travelling through the memory-mapped fabric with addresses associated with the particular device.

Still further, as used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Still further, the term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

Each of master device 102 and slave device 106 includes one or more input/output (I/O) ports. An I/O port may be used for input, output, or both. For example, in one embodiment, master device 102 includes an output I/O port (i.e. egress port) for sending packets and/or other data to switch 108 and a separate input I/O port (i.e. ingress port) for receiving packets and/or other data from switch 108. In another embodiment, master device 102 uses an I/O port for both input/ingress and output/egress. Each of master device 102, slave device 106, and switch 108 may include any appropriate number of I/O ports.

In the illustrated embodiment, master device 102 includes functional element 112, which may be configured to perform various functions of master device 102. Similarly, slave device 106 includes functional element 116, which may be configured to perform various functions of slave device 106. Switch 108 includes processing element 118, which may be configured to implement various functions of switch 108.

As used herein, the term "processing element" may refer to various elements or combinations of elements. Processing elements include, for example, portions or circuits of individual processor cores, entire processor cores, individual processors, programmable hardware devices, and/or larger portions of systems that include multiple processors.

The master device 102 and slave device 106 of FIG. 1A may reside in different clock domains. As used herein the term "clock domain" refers to a group of one or more processing elements or devices that maintain time based on a given physical clock. Thus, devices that maintain time based on different physical clocks are referred to as residing in different clock domains. Different physical clocks may "drift" with respect to each other, e.g., due to quartz variations, even for similarly configured clocks. Therefore, synchronization between clocks of different clock domains may be desirable. In addition, master device 102 and slave device 106 of FIG. 1A may reside in and may be separated by a non-transparent bridge (NTB), e.g., switch 108 may comprise a NTB. Because each side of a NTB is logically isolated from the other, data and status exchange between the two domains cross clock boundaries and may additionally cross address spaces.

In one embodiment, master device 102 determines a mapping between the global time and counter A and sends the mapping to slave device 106. In this embodiment, slave device 106 determines a mapping between its local time and counter A and synchronizes its local time to the global time based on the mapping between the global time and counter A and the mapping between the local time and counter A.

Referring now to FIG. 1B, a diagram illustrating one embodiment of exemplary mapping for synchronization is shown. In this embodiment, at time t1, master device 102 sends a request packet to switch 108. Switch 108 receives the request packet, reads counter value C1 from counter A, and sends a completion packet comprising counter value C1 back to master device 102. Master device 102 receives the completion packet at time t2. In one embodiment, master device 102 maps its global time to counter A by determining a global time value M corresponding to the counter value C1. In one embodiment, master device 102 determines M as a midpoint between time t1 and time t2. In other embodiments, other methodologies are used to determine a global time value corresponding to the counter value.

In this embodiment, master device 102 subsequently sends a synchronization packet comprising counter value C1 and the global time value M corresponding to the counter value C1. Slave device 106 receives the synchronization packet. In one embodiment, at time t3, slave device 106 sends a request packet to switch 108 (note that this request packet is a different packet than the request packet sent by master device 102, although it may be similar in format). Switch 108 receives the request packet, reads counter value C2 from counter A, and sends a completion packet comprising counter value C2 back to slave device 106 (note that this completion packet is a different packet than the completion packet sent by switch 108 to master device 102, although it may be similar in format). Slave device 106 receives the completion packet at time t4. In one embodiment, slave device 106 maps its local time to counter A by determining a local time value S corresponding to the counter value C2. In one embodiment, slave device 106 determines S as a midpoint between time t3 and time t4. In other embodiments, other methodologies are used to determine a local time value corresponding to the counter value.

Master device 102 and slave device 106 may time stamp packets to determine times t1-t4. Time stamping may be based on the global time or local time. For example, if a device uses a counter to maintain its global/local time, the device may time stamp packets using counter values of the counter. In other embodiments, other counters may be used for time stamping, e.g., counters associated with one or more relevant I/O ports.

In one embodiment, based on the mappings (in this embodiment, e.g., based on the values C1, C2, M, and S), slave device 106 synchronizes its local time to the master time. In one embodiment, slave device 106 calculates an offset by which to adjust its local time (e.g., by adjusting its logical clock or its time stamping). In one embodiment, the offset is calculated as:

$$\text{offset} = S - M + (C2 - C1)$$

or some equivalent calculation. Slave device 106 may adjust its local clock based on the offset. For example, in one embodiment where slave device 106 maintains a logical clock using a counter, slave device 106 may add the offset to a current value of the counter. In another embodiment, slave device 106 may adjust its time stamping by the offset. In various embodiments, various methodologies are contemplated to synchronize the local time to the global time based on the first and second mappings. In some embodiments where the counter runs at a different rate than the slave clock, an additional calculation may be required to bring all clocks/counters to a common base before calculating the offset. Generally, various calculations may be performed to bring time values, clocks, and/or counters to a common base before performing various time-related determinations and/or calculations described herein.

Synchronization of local device time(s) to a global time of a master device may facilitate applications that require time synchronization over memory-mapped, switched fabrics having various domains.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where embodiments may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Additionally, the techniques disclosed herein may be further applicable in other domains, such as, for example, audio/video applications, timed data acquisition, radio frequency applications, etc., among others.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

Figure 4:
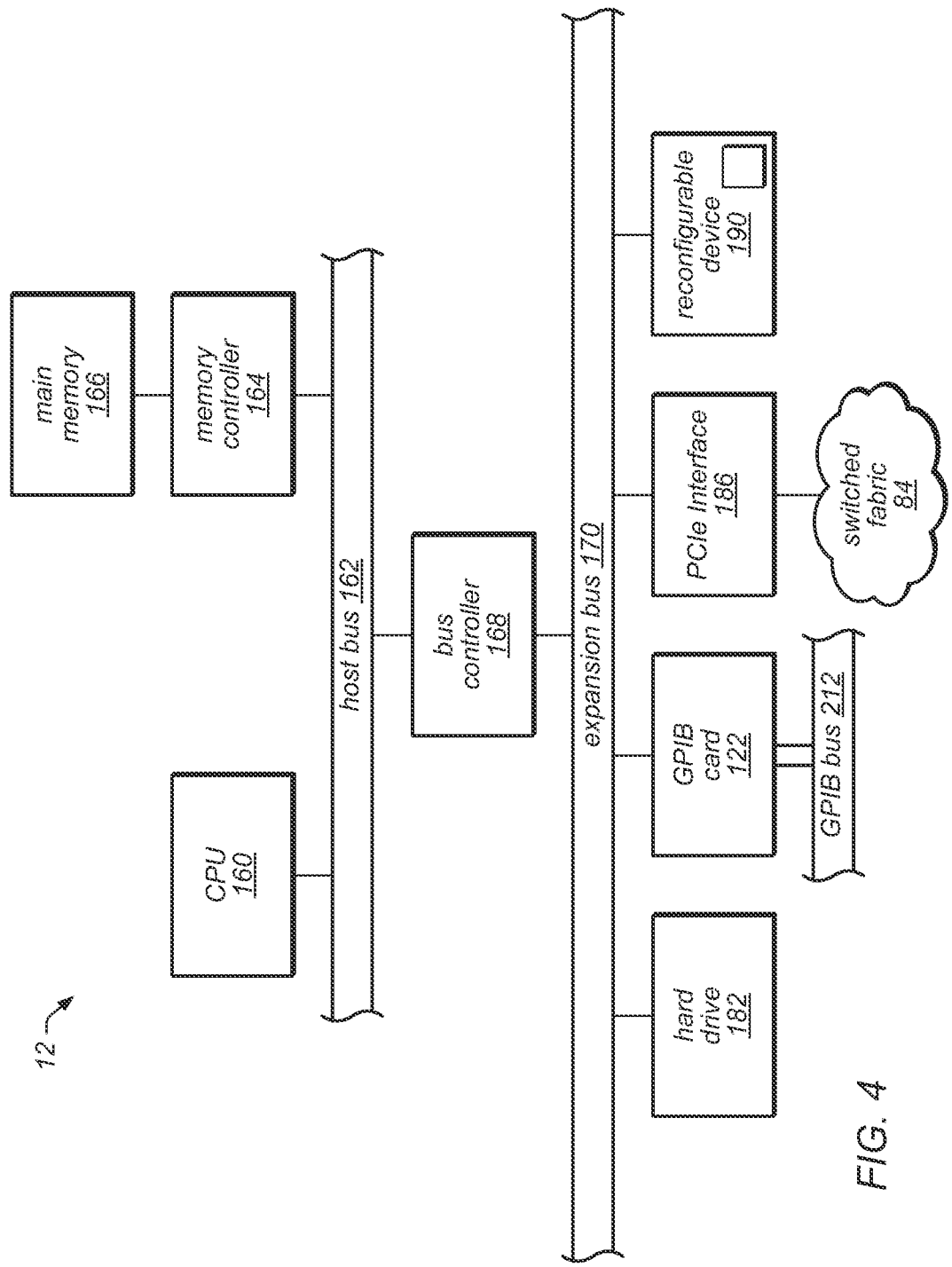
FIG. 4 is an exemplary block diagram of the computer systems of FIGS. 2A, 2B, and 3B.

The one or more instruments may include a GPIB instrument 212 and associated GPIB interface card 122, a data acquisition board 114 inserted into or otherwise coupled with chassis 124 with associated signal conditioning circuitry 126, a VXI instrument 116, a PXI instrument 218, a video device or camera 132 and associated image acquisition (or machine vision) card 134, a motion control device 136 and associated motion control interface card 138, and/or one or more computer based instrument cards 142, among other types of devices. In one embodiment, the computer 82 may couple to a switched fabric, e.g., a PCIe (Peripheral Component Interconnect (PCI) Express) based switched fabric, e.g., via a PCIe interface, as indicated in FIG. 4, and may couple to one or more instruments or other devices with respective (and different) clock domains, as discussed in more detail below.

The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments, possibly via a switched fabric, e.g., In one embodiment, the computer 82 may couple to a switched fabric, e.g., a PCIe based switched fabric, e.g., via a PCIe interface, as indicated in FIG. 4, and may couple to one or more instruments or other devices with respective (and different) clock domains. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 218, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
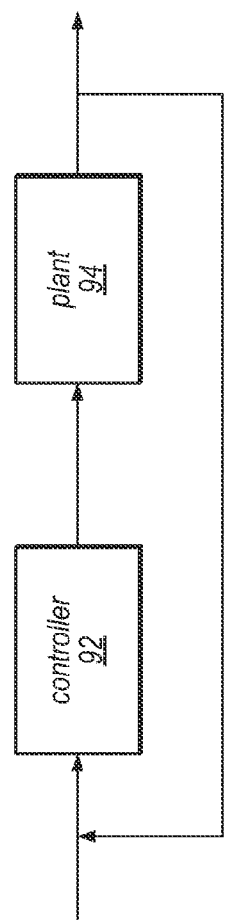
FIG. 3A is a high level block diagram of an exemplary system which may execute or utilize embodiments of the invention.

FIG. 3A is a high level block diagram of an exemplary system which may execute or utilize programs according to some embodiments. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, e.g., a graphical program, which specifies or implements the functionality of one or both of the controller 92 and the plant 94. For example, a control engineer may use a modeling and simulation tool to create a model (e.g., program) of the plant 94 and/or to create the algorithm (program) for the controller 92. Embodiments of the techniques disclosed herein may be used to synchronize components of such a system.

Figure 3B:
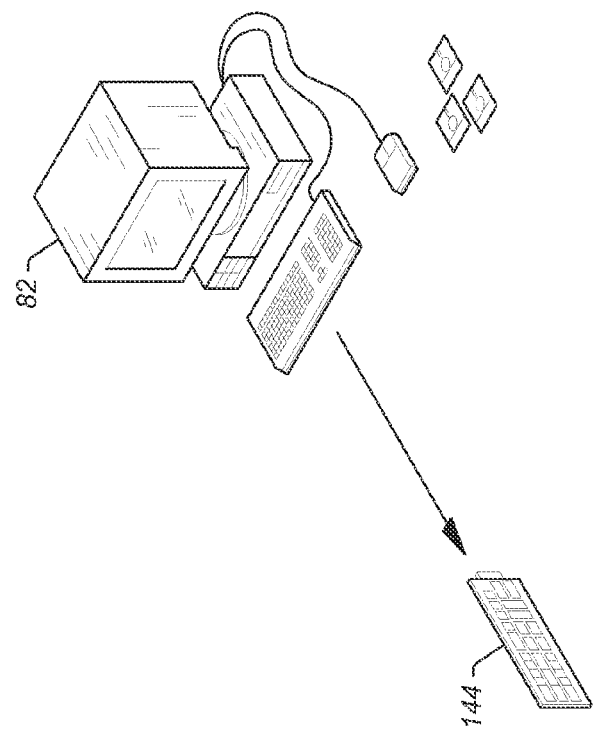
FIG. 3B illustrates an exemplary system which may perform control and/or simulation functions utilizing embodiments of the invention.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, e.g., a graphical program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. Embodiments of the techniques disclosed herein may be used to synchronize devices in such systems. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

FIG. 4—Computer System Block Diagram

FIG. 4 is a block diagram representing one embodiment of a computer system or controller, as shown in FIG. 1, 2A, or 2B, which may be used for a slave or master device, according to some embodiments. It is noted that any type of computer system configuration or architecture can be used as desired, and FIG. 4 illustrates a representative PC embodiment. It is also noted that the computer system may be a general purpose computer system, a computer implemented on a card installed in a chassis, a controller, e.g., an embedded controller, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the program(s) configured to implement embodiments of the invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 212, and/or a PCIe (Peripheral Component Interconnect (PCI) Express) interface 186 for coupling to a switched fabric 84, e.g., a PCIe based switched fabric, although other switched fabrics and interfaces may be used as desired.

As shown, a device (or multiple devices, e.g., controllers) 190 may also be connected to the computer. The device 190 may include a processor and memory which may execute a real time operating system. The device 190 may also or instead comprise a programmable hardware element. The computer system may be configured to deploy a program to the device 190 for execution. The deployed program may take the form of graphical program instructions or data structures that directly represents the graphical program. Alternatively, the deployed program may take the form of text code (e.g., C code), which may be written, or generated from a graphical program. As another example, the deployed program may take the form of compiled code generated from either the graphical program or from text code, which may itself have been generated from the graphical program.

Time Synchronization with in-Switch Delay Determination

Figure 5:
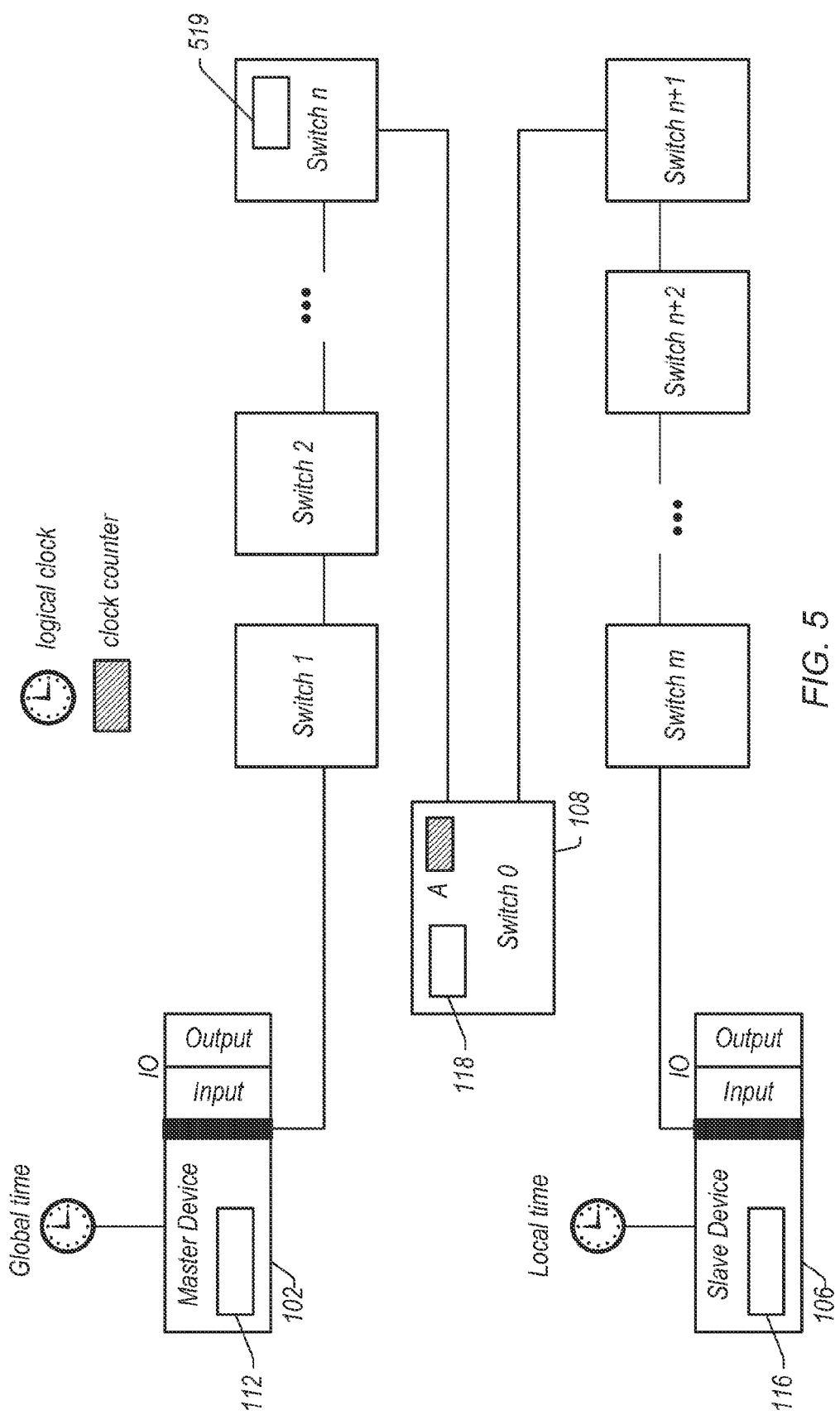
FIG. 5 is a block diagram illustrating an exemplary distributed system with one or more additional switches between a master device and a slave device, according to one embodiment.

Referring now to FIG. 5, master device 102 is coupled to slave device 106 via other switches in addition to switch 108. In the illustrated embodiment, master device 102 is coupled to switch 108 via switches 1 through n. Similarly, slave device 106 is coupled to switch 108 via switches n+1 through m. The switches of FIG. 5 may include processing elements such as processing element 519 of switch n which may be configured to facilitate and/or implement various switch functionality (other processing elements of other switches are not shown). The switches of FIG. 5 may include transparent and/or non-transparent bridges. In the illustrated embodiment, multiple other switches 1 through m in addition to switch 108 are shown. In other embodiments, there may be no other switches, one other switch, or any appropriate number of other switches.

When synchronizing the local time of slave device 106 to the global time of master device 102 (e.g., as described above with reference to FIG. 1B), in-switch transaction delays of request and completion packets in the various switches may complicate mapping the global time and/or the device time to counter A. In-switch transaction delays may be caused by traffic congestion and transaction buffering in switches. Thus, the travel time of the request packet may be different than the travel time of the completion packet (i.e. their travel times may be asymmetric), and mapping between a global or local time and counter A may require consideration of the in-switch delays to correct for such asymmetry.

As used herein, the term "in-switch delay" refers to delay related to receiving and forwarding a packet or delay related to receiving a packet and transmitting a related packet. Thus, determining an in-switch delay may include determining or approximating a time interval between receiving a packet and forwarding the packet or receiving a packet and transmitting a related packet. In some embodiments, removing in-switch delays from a determination of the travel time of a packet may leave only cable delays.

FIG. 5 shows a single slave device 106 in order to explain one embodiment of a method for synchronizing a local time of a slave device to a global time of master device 102. In other embodiments, multiple slave devices may be coupled to master device 102 via a memory mapped fabric, and may synchronize their local times to the global time. In one embodiment, a device may send a particular packet to request a synchronization packet from master device 102. In another embodiment, master device 102 may periodically send synchronization packets to one or more slave devices such as slave device 106.

Figure 6:
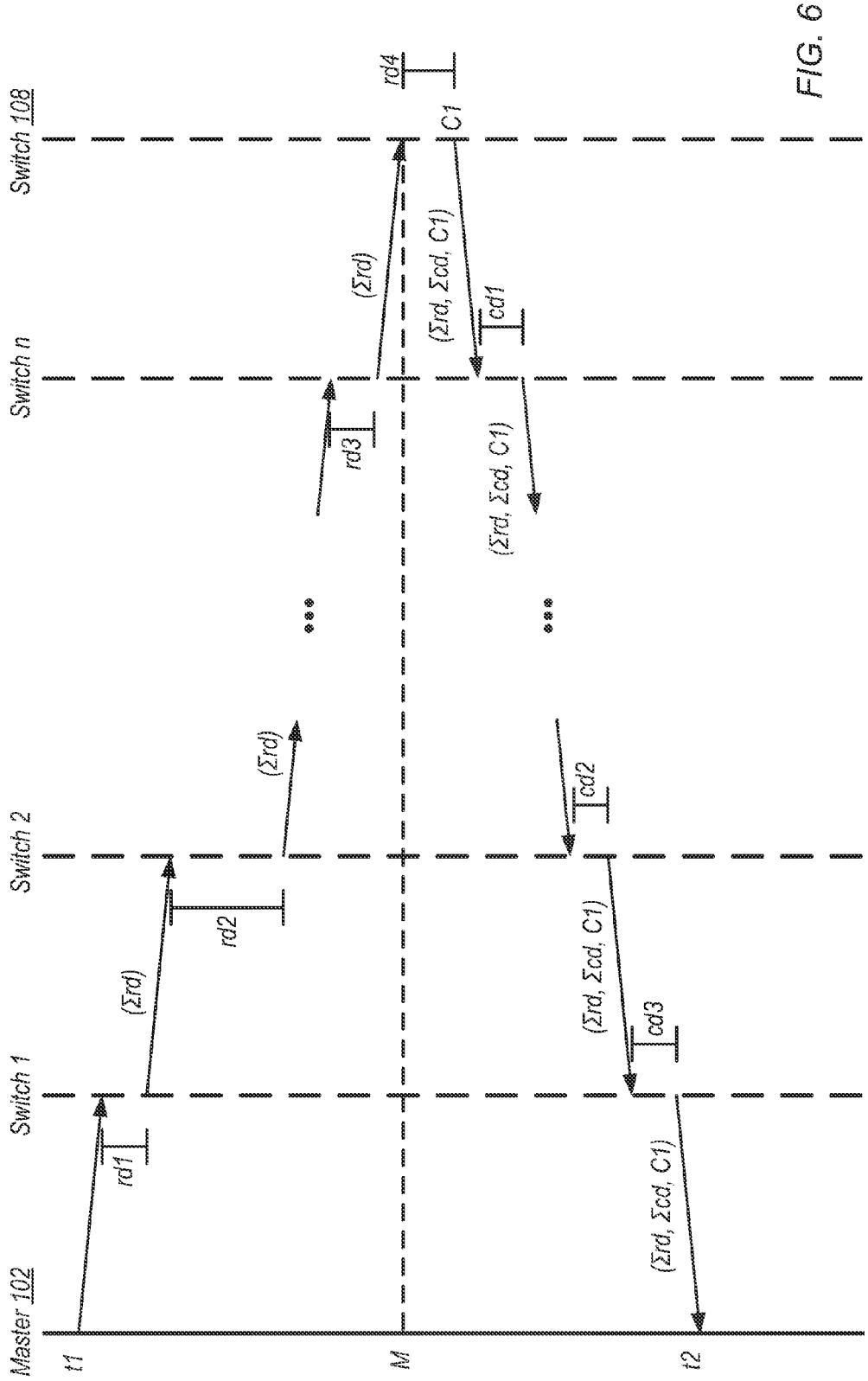
FIG. 6 is a diagram illustrating exemplary travel of a request packet and a completion packet, according to one embodiment.

Referring now to FIG. 6, a diagram illustrating exemplary travel of a request packet and a completion packet is shown. In one embodiment, master device 102 sends a request packet at time t1. The request packet is received at switch 1, and forwarded to switch 2 after an in-switch delay rd1 (request delay 1). In one embodiment, a request delay field in the request packet stores an accumulation of request delays (i.e., in-switch delays of the request packet), shown as Σrd. After proceeding through switch 2 and switch n, the request packet arrives at switch 108. At switch 108, further in-switch delay may be incurred, before switch 108 sends a completion packet with counter value C1 to master device 102. The completion packet may incur in-switch delays similarly to the request packet, which may be accumulated in a completion delay field of the completion packet (shown as Σcd). The completion packet may also include a request delay field to store the accumulated in-switch delays of the request packet. In one embodiment, switch 108 copies a value of the request delay field of the request packet into the request delay field of the completion packet (i.e. before adding its request delay to the request delay field). In another embodiment, switch 108 reads a value of the request delay field of the request packet, adds its in-switch delay to the value, and stores the result in the request delay field of the completion packet. The request delay field and completion delay field may be referred to generally as "transaction delay fields." Master device 102 receives the completion packet at time t2.

In the illustrated embodiment, switch 108 adds its in-switch delay to the request delay field. In other embodiment, the in-switch delay of switch 108 may be split into separate portions, including a request delay portion and a completion delay portion. For example, switch 108 may add a delay between receiving the completion packet and reading the counter value C1 to the request delay field. In this example, the switch may add a delay between reading the counter value C1 and transmitting the completion packet to the completion delay field.

In other embodiments, the request and completion packets may not include transaction delay fields (i.e. the request delay field and completion delay field). For example, the switches may store their in-switch delay in respective storage elements. The term "storage element" refers to any of a register, a memory, a latch, a disk, and so on, that is configured to store a value either in a volatile or non-volatile manner. In this embodiment, master device 102 may send one or more read packets to the switches in order to read the in-switch transaction delays. The switches may be configured to retrieve their respective in-switch delays from their respective storage elements and transmit respective packets to master device 102 in response to receiving a read packet.

Slave device 106 may send a request packet and receive a completion packet through one or more switches in a similar manner to master device 102 as described above. Thus, slave device 106 may receive a completion packet with counter value (such as counter value C2) and accumulated request delays and accumulated completion delays. In another embodiment, slave device 106 may send one or more read packets to read respective in-switch delays stored in the switches. In another embodiment, master device 102 and slave device 106 map their respective times to a counter of a switch closest to slave device 106 (i.e. "closest" in terms of number of switches separating elements, e.g., there are no other switches separating the closest switch and slave device 106). In this embodiment, slave device 106 may use only in-switch delays of the switch closest to slave device 106 in mapping its local time to the counter.

In embodiments where request and/or completion packets do not travel through other switches in addition to switch 108, switch 108 may still determine and indicate its in-switch delay, e.g., as a request delay, or as separate request delay and completion delay portions.

Figure 7:
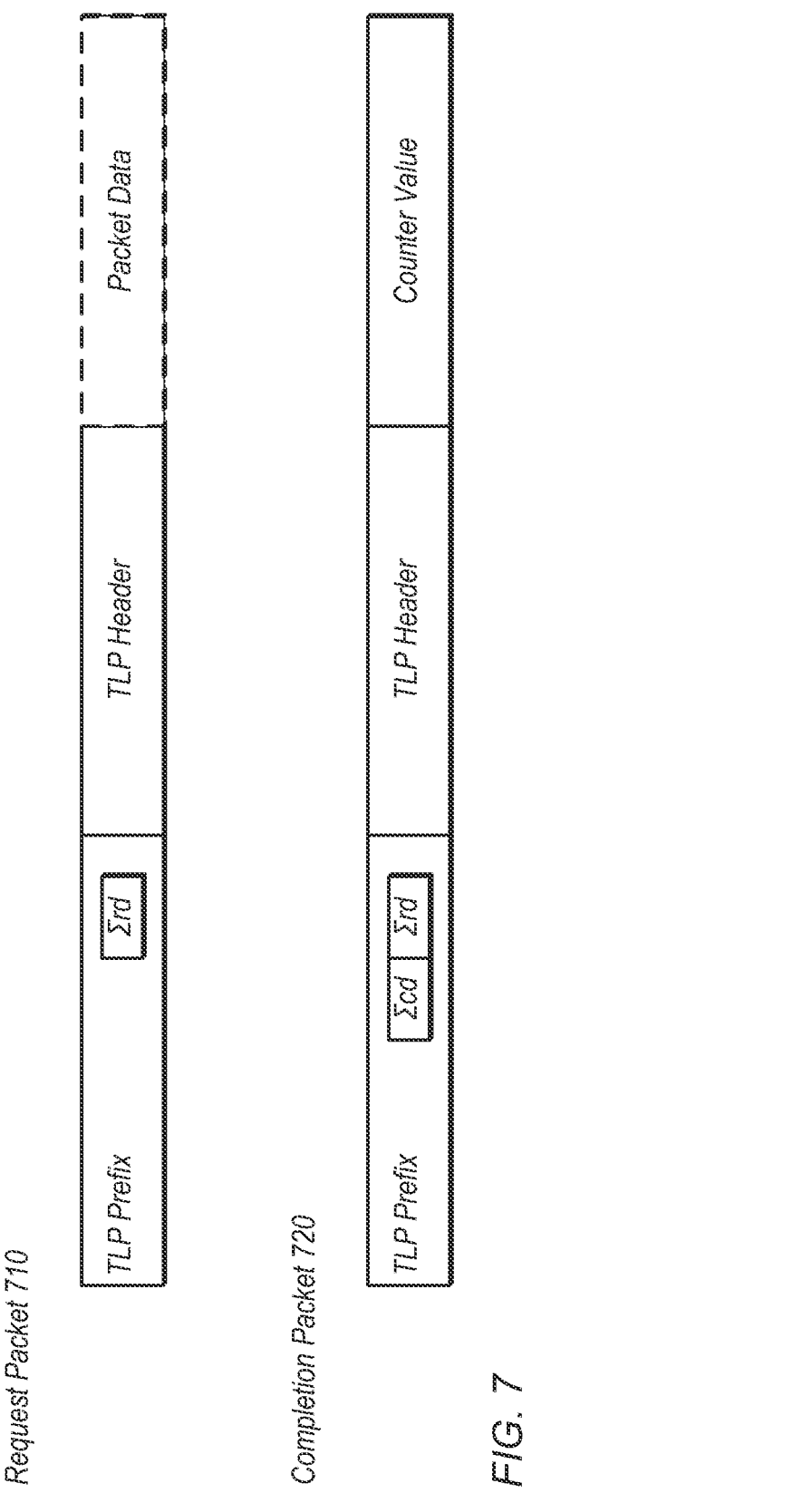
FIG. 7 is a block diagram illustrating one embodiment of exemplary request and completion packets, according to one embodiment.

Referring now to FIG. 7, exemplary request and completion packets are shown. In the illustrated embodiment, the request and completion packets are PCIe packets. In the illustrated embodiment, request packet 710 includes a transaction layer packet (TLP) prefix (which in turn includes a request delay (rd) field Σrd (for accumulated rd's)), a TLP header, and optional packet data. Completion packet 720 includes a TLP prefix (which in turn includes a completion delay (cd) field Σcd (for accumulated cd's) and a request delay field Σrd), a TLP header, and a counter value (e.g., a counter value read from counter A of switch 108). The TLP header may be vendor defined and may indicate that one or more switches should determine and/or indicate their transaction delays. In other words, based on detecting the TLP header, a switch may be configured to store its in-switch transaction delay in the completion delay field, the request delay field, or both.

In one embodiment, the TLP header specifies that an in-switch delay is to be stored in a local storage element of a switch. In the illustrated embodiment, the TLP header specifies that an in-switch delay is to be stored in a transaction delay field. In the illustrated embodiment, the request delay field stores an accumulation of in-switch delays of the request packet and the completion delay field stores an accumulation of in-switch delays of the completion packet. Thus, a switch may be configured to add its in-switch delay to a value in the completion delay field and/or the request delay field. The packets of FIG. 7 are illustrated as PCIe packets to show one embodiment of packets for synchronizing devices over a switched network. In other embodiments, other formats of PCIe packets may be used. In various embodiments, various other types of packets are contemplated in addition to PCIe packets.

Devices may map their time to a counter value of a switch such as switch 108 using the in-switch delays. For example, master device 102 may map its time to counter A based on a sending time corresponding to sending a request packet (e.g., t1), a completion time corresponding to receiving the completion packet (e.g., t2) and the in-switch delays. Similarly, slave device 106 may map its time to counter A based on a sending time corresponding to sending a request packet (e.g., t3), a completion time corresponding to receiving the completion packet (e.g., t4) and the in-switch delays.

Master device 102 and slave device 106 may determine a one-way delay between a latching time corresponding to the counter value (i.e., corresponding to reader the counter value) and the completion time using the determined in-switch delays to compensate for asymmetry in travel of the request packet and the completion packet caused by the in-switch delays. This may allow master device 102 and slave device 106 to determine time values corresponding to counter values (e.g., M to C1 and S to C2).

In one embodiment, a device (e.g., master device 102 or slave device 106) is configured to determine a one way cable delay of a packet. For example, master device 102 may use the equation:

$$\text{cable\_delay} = \frac{t2 - t1 - \sum rd - \sum cd}{2}$$

where $\Sigma rd$ is an accumulation of in-switch delays of the request packet and $\Sigma cd$ is an accumulation of in-switch delays of the completion packet. In various embodiments, this one-way cable delay may be symmetric (i.e., substantially the same for the request packet and the completion packet), because wire delays are not substantially affected by packet traffic. In one embodiment, a device may use the one-way cable delay to map its time to a counter. For example, master device 102 may use one of the following equations to determine a global time value M corresponding to the counter value C1:

$M = t2 - \text{cable\_delay} - \Sigma cd$ or $M = t1 + \text{cable\_delay} + \Sigma rd$ Including in-switch delays in mapping determinations may substantially increase synchronization accuracy by accounting for asymmetry in packet travel times. Slave device 106 may use similar equations and methodologies as described above for master device 102, e.g., to determine the value S corresponding to counter value C2.

Figure 8:
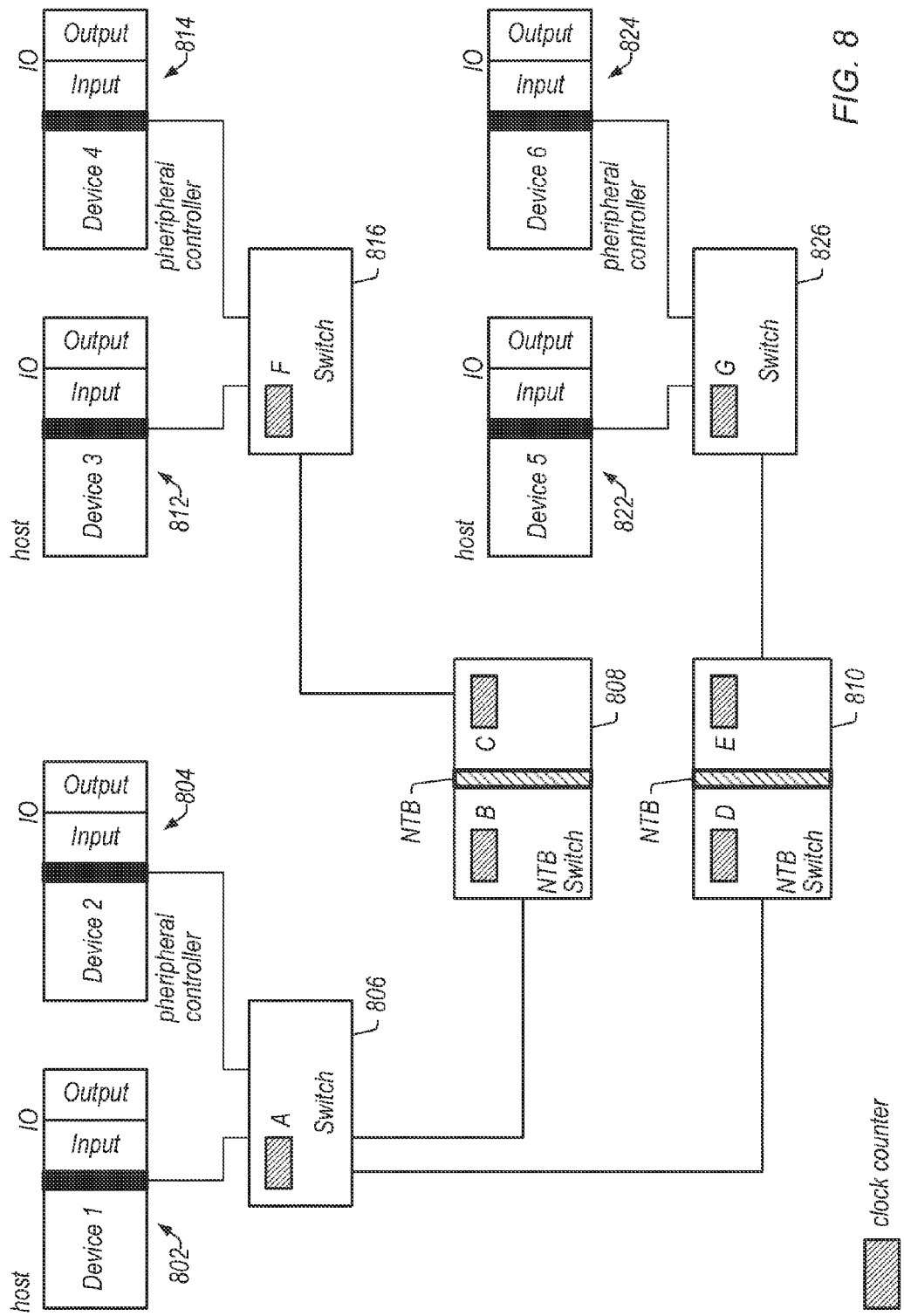
FIG. 8 is a block diagram illustrating an exemplary distributed system with non-transparent bridges, according to one embodiment.

Referring now to FIG. 8, a system including multiple clock domains separated by non-transparent bridges (NTB's) is shown. NTB switch 808 and NTB switch 810 each include at least one NTB. A NTB switch functions as a gateway between processors. It isolates intelligent (processor based) subsystems from each other by masquerading as endpoints to discovery software and translating the addresses of transactions that cross the bridge. It hides the devices connected to each intelligent system from each other. Thus, devices separated by a NTB reside in different clock domains and address spaces. E.g., host devices 802, 812, and 822 all reside in different domains, separated by NTB's.

In one embodiment, a NTB switch includes a counter for each domain. For example, NTB switch 808 includes counter B corresponding to the domain of host device 802 and counter C 808 corresponding to the domain of host device 812. In some embodiments, a NTB switch may include a plurality of NTB's separating a plurality of domains.

Synchronization of devices in the system of FIG. 8 may generally be performed as described above with reference to FIGS. 5-7. In various embodiments, a master device and a slave device that synchronizes its time with the master device may read from the same counter. For example, device 802 may maintain a global time and may map the global time to counter C. Device 812 and/or device 814 may also map their respective local times to counter C and may receive a synchronization packet from device 802. Using the mappings, device 812 and/or device 814 may synchronize their local time with the global time, as described above with reference to FIGS. 5-6. As a further example, device 822 may synchronize with a global time of device 802 by receiving a mapping of the global time to counter E and mapping its local time to counter E, then adjusting the local time based on the mappings. Thus, devices in different first and second clock domains may synchronize their local times to a global time of a master device in a third clock domain.

In one embodiment, a master device 102 and slave device 106 may map their respective times to a counter of a NTB switch where the counter corresponds to a clock domain of slave device 106. In this embodiment, when there are multiple slave devices in different clock domains the mappings of the master device may be different for the different clock domains. In another embodiment, a master device and a slave device may map their respective times to a counter of a NTB switch where the counter corresponds to the master device's clock domain.

In-Switch Delay Determination

In one embodiment, a switch is configured to determine a receiving time corresponding to receiving a packet at an ingress port of the switch. In one embodiment, the switch may time stamp the packet with a counter value corresponding to arrival of the packet at the ingress port. Similarly, in one embodiment, the switch is configured to determine a forwarding time (or transmitting time) corresponding to forwarding or transmitting a packet from an egress port of the switch. In one embodiment, the switch may determine the in-switch delay by determining a difference between the receiving time and the forwarding time (or transmitting time). In embodiments where one or more counters are used to time stamp the packets, the counters may be the same counter or different counters. As described above with reference to FIG. 1A, the ingress port and the egress port may be the same port in some embodiments.

According to one embodiment of a switch where the switch includes a counter and is configured to receive a request packet requesting a counter value (e.g., switch 108 of FIG. 1A), the switch is configured to determine separate request and delay portions of an in-switch delay. In one embodiment, the switch determines a request delay portion as a time between a receiving time and a latching time corresponding to reading the counter value. In this embodiment, the switch is configured to determine a completion delay as a time between the latching time and the transmitting time (or forwarding time). As discussed above with reference to FIGS. 5 and 6, the switch may store these portions of in-switch delays using packet fields or using internal storage elements.

In some embodiments, accumulating in-switch transaction delays may not compensate for delays incurred in a bridge between the fabric and a host controller (e.g., a PCIe root complex). Such a bridge may be a propriety interface between a memory controller of a host controller and the memory-mapped fabric. Some transactions over the memory-mapped fabric may be transmitted through such a bridge. In some embodiments, the bridge may be configured to determine and indicate bridge-related delays (i.e., in-complex delays in PCIe embodiments) using techniques similar to those described above for switches. In some embodiments, the bridge may include a switch, which may be configured as described above with reference to other switches in the fabric. Bridge or in-complex delays may be processed similarly to in-switch delays (e.g., accumulated with other request and/or completion delays). In other embodiments, devices may be connected using a peer-to-peer topology such that communication between devices does not span a root complex.

Methods for Time Synchronization and in-Switch Delay Determination

Figure 9A:
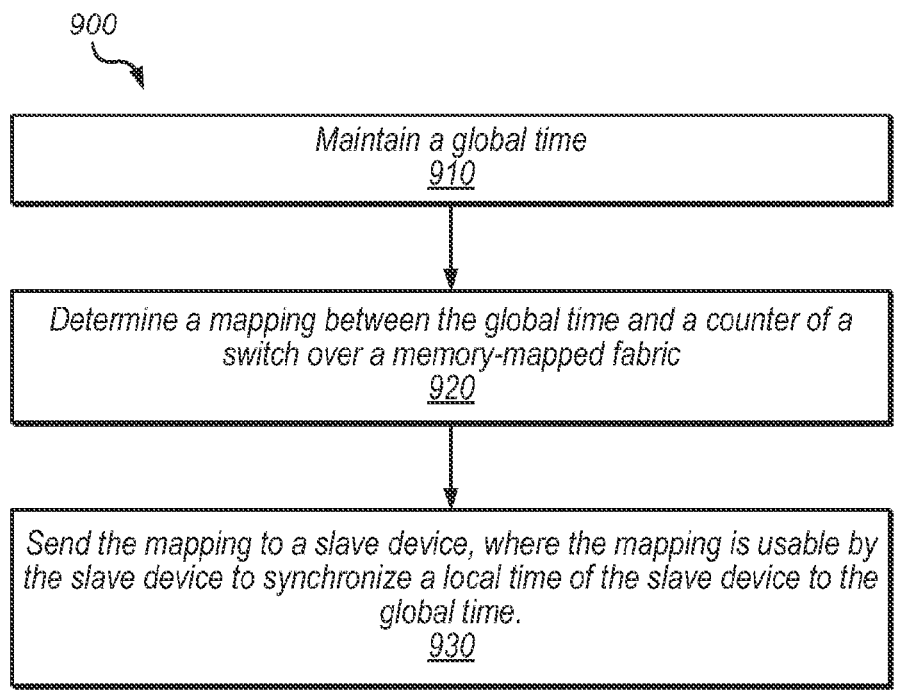
FIGS. 9A and 9B are flow diagrams illustrating embodiments of a method for synchronizing devices.

Referring now to FIG. 9A, a flow diagram illustrating one exemplary embodiment of a method 900 for time synchronization is shown. The method shown in FIG. 9A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 910.

At block 910, a master device maintains a global time. The master device may maintain the global time using a logical clock. In one embodiment, the global time is maintained by a counter coupled to a clock. The global time may be "global" in the sense that one or more slave devices may synchronize their local time(s) to the global time. Flow proceeds to block 920.

At block 920, the master device determines a mapping between the global time and a counter of a switch via a memory-mapped fabric. In one embodiment, the mapping comprises a global time value and a corresponding counter value. In one embodiment, the master device determines the mapping by sending a request packet to the switch and receiving a completion packet from the switch, where the completion packet contains the counter value. In one embodiment, the master device is configured to request a counter value from a switch, where the counter is associated with a time domain of a slave device. In some embodiments, the master device determines the mapping based on in-switch delays of the request packet and the completion packet, as described above with reference to FIGS. 5-7. Flow proceeds to block 930.

At block 930, the master device sends the mapping to the slave device, where the mapping is usable by the slave device to synchronize a local time of the slave device to the global time. The master device may send the mapping in a synchronization packet. In some embodiments, the synchronization packet may travel through a non-transparent bridge, which may translate an address of the synchronization packet to a memory space of the slave domain. Flow ends at block 930.

Figure 9B:
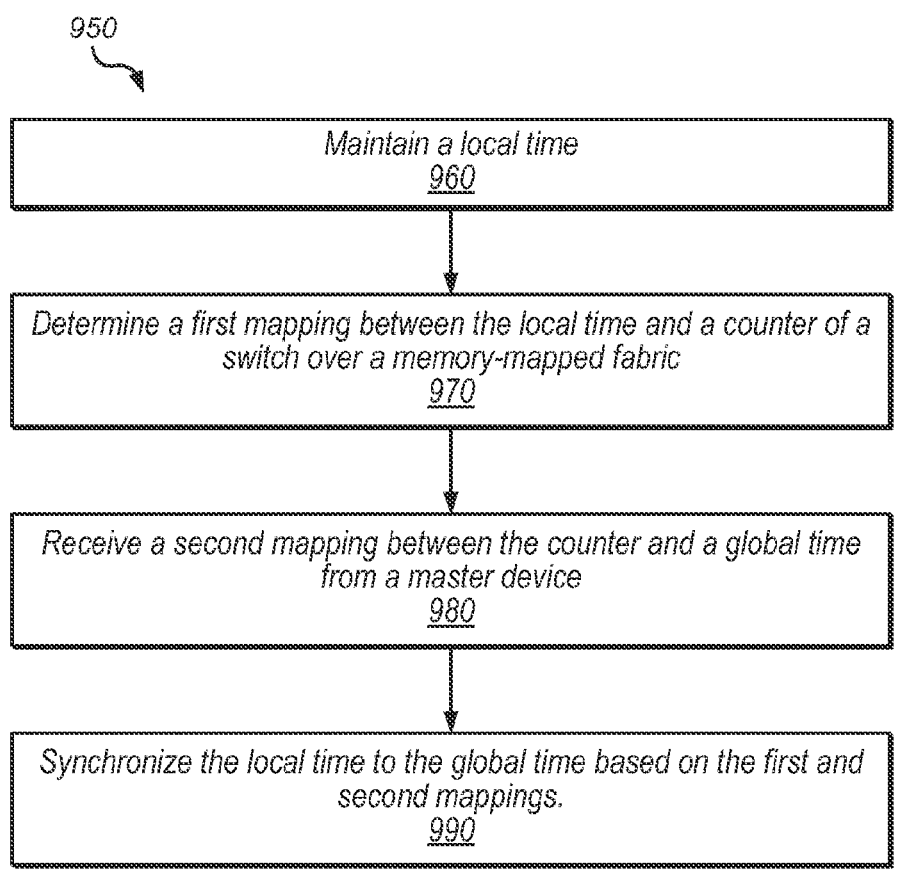

Referring now to FIG. 9B, a flow diagram illustrating one exemplary embodiment of a method 950 for time synchronization is shown. The method shown in FIG. 9B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 960.

At block 960, a slave device maintains a local time. The slave device may maintain the local time using a logical clock. In one embodiment, the slave device maintains the local time with a counter coupled to a clock. Flow proceeds to block 970.

At block 970, the slave device determines a first mapping between the local time and a counter of a switch via a memory-mapped fabric. In one embodiment, the mapping comprises a local time value and a corresponding counter value. In one embodiment, the slave device determines the mapping by sending a request packet to the switch and receiving a completion packet from the switch, where the completion packet contains the counter value. In one embodiment, the slave device is configured to request a counter value from a switch where the counter is associated with a time domain of the slave device. In some embodiments, the slave device determines the mapping based on in-switch delays of the request packet and the completion packet, as described above with reference to FIGS. 5-7. Flow proceeds to block 980.

At block 980, the slave device receives a second mapping between the counter and a global time from a master device. In one embodiment, the slave device receives the second mapping in a synchronization packet. In one embodiment, the slave device requests the synchronization packet from the master device. In another embodiment, the slave device receives the synchronization packet periodically. Flow proceeds to block 990.

At block 990, the slave device synchronizes the local time to the global time based on the first and second mappings. In one embodiment, the slave device adjusts the local time based on an offset calculated based on the first and second mappings. In another embodiment, the slave device adjusts time stamping based on the first and second mappings. The slave device may synchronize its local time to the global time using various methodologies, e.g., as described above with reference to FIG. 2A. Flow ends at block 990.

Figure 10A:
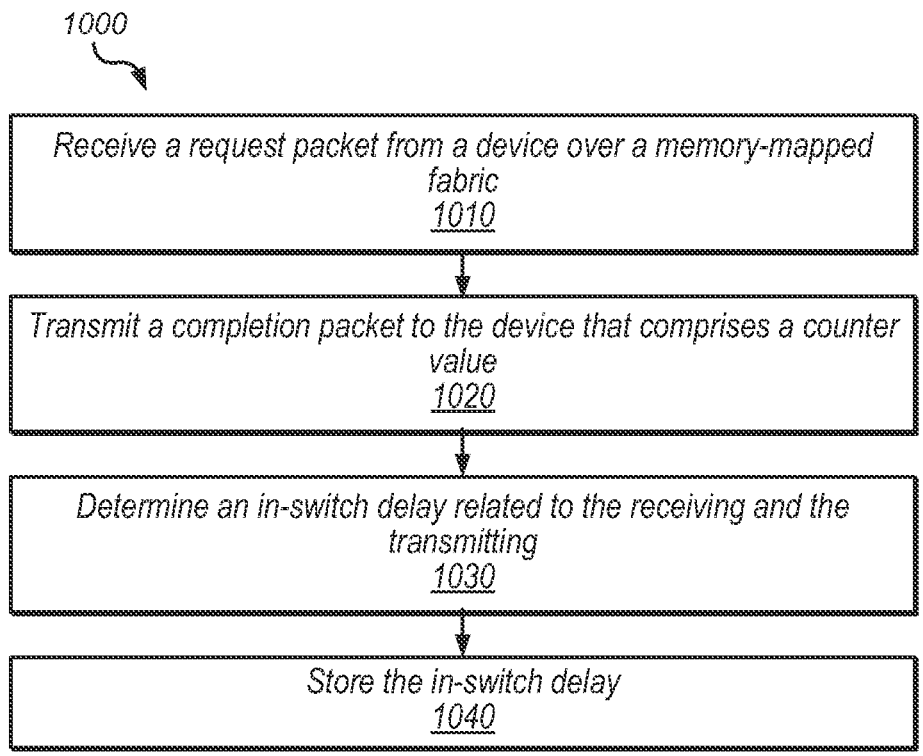
FIGS. 10A and 10B are flow diagram illustrating embodiments of respective methods for packet handling in switches.

Referring now to FIG. 10A, a flow diagram illustrating one exemplary embodiment of a method 1000 for time synchronization is shown. The method shown in FIG. 10A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 1010.

At block 1010, a switch receives a request packet from a device over a memory-mapped fabric. The request packet may request a counter value of the switch, e.g., in order to map a time of the device to a counter of the switch. The request packet may travel through one or more other switches before arriving at the switch. The request packet may include a request delay field for storing an accumulation of in-switch delays of the request packet. Flow proceeds to block 1020.

At block 1020, the switch transmits a completion packet to the device, and the completion packet comprises a counter value. In one embodiment, the switch comprises multiple counters, each associated with a time domain. In one embodiment, the switch reads the counter value from a counter associated with the time domain of the device. In another embodiment, the switch reads the counter value from a counter associated with another time domain that is not associated with the device. Flow proceeds to block 1030.

At block 1030, the switch determines an in-switch delay related to the receiving and the transmitting. In one embodiment, the switch determines the in-switch delay as separate request and completion portions. For example, the request portion may be an interval between receiving the request packet (i.e. a receiving time) and reading the counter value (i.e. a latching time). The completion portion may be an interval between reading the counter value and transmitting the completion packet (i.e. a completion time). The switch may time stamp packets at an ingress port and an egress port. The switch may include additional counters associated with the ingress and/or egress ports to facilitate such time stamping. Flow proceeds to block 1040.

At block 1040, the switch stores the in-switch delay. In one embodiment, the switch stores the in-switch delay in a storage element comprised in the switch. In this embodiment, the switch may retrieve the in-switch delay and transmit the in-switch delay in an information packet to the device, e.g., in response to receiving a read packet from the device. In another embodiment, the switch stores the in-switch delay in the completion packet before transmitting the completion packet. For example, the switch may store a request portion of the in-switch delay in a request delay field and a completion portion of the in-switch delay in a completion delay field. In one embodiment, the switch may add the in-switch delay (or portions thereof) to values in the request delay field and/or the completion delay field. Flow ends at block 1040.

Figure 10B:
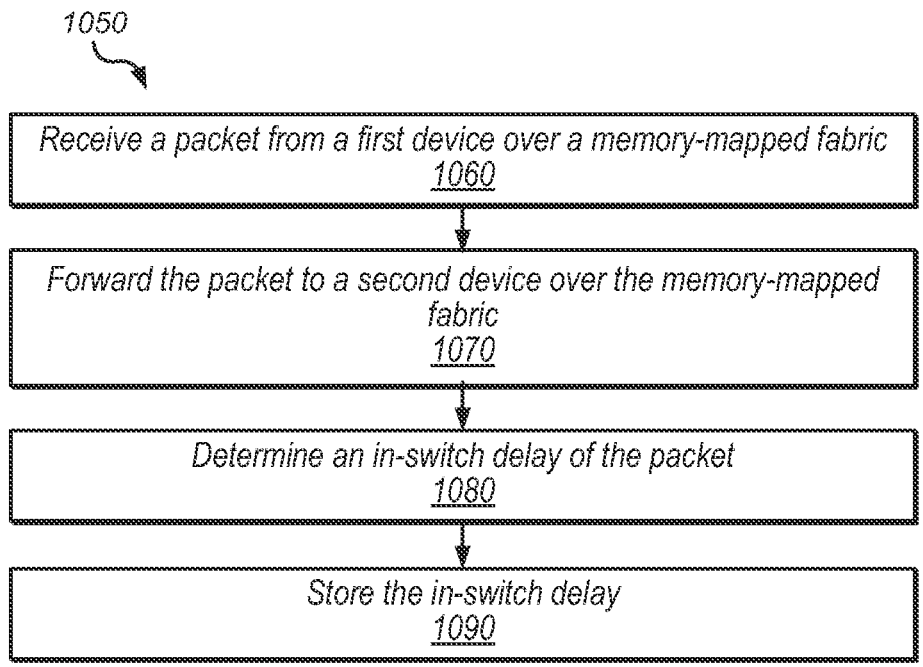

Referring now to FIG. 10B, a flow diagram illustrating one exemplary embodiment of a method 1050 for time synchronization is shown. The method shown in FIG. 10B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 1060.

At block 1060, a switch receives a packet from a first device over a memory-mapped fabric. In one embodiment, the first device is master device 102 or slave device 106 and the packet is a request packet. In another embodiment, the first device is a switch (e.g., the switch of FIG. 9A) and the packet is a completion packet. The packet may include one or more transaction delay fields for storing in-switch delays (e.g., a request delay field and/or a completion delay field). Flow proceeds to block 1070.

At block 1070, the switch forwards the packet to a second device over the memory-mapped fabric. In one embodiment, the second device is master device 102 or slave device 106 and the packet is a completion packet. In another embodiment the second device is a switch (e.g., the switch of FIG. 9A) and the packet is a request packet. Flow proceeds to block 1080.

At block 1080, the switch determines an in-switch delay of the packet. In one embodiment the switch determines the in-switch delay by determining a difference between a receiving time corresponding to receiving the packet and a forwarding time corresponding to forwarding the packet. Flow proceeds to block 1090.

At block 1090, the switch stores the in-switch delay. In one embodiment, the switch stores the in-switch delay in a storage element comprised in the switch. In this embodiment, the switch may retrieve the in-switch delay and transmit the in-switch delay in an information packet to the first device or the second device, e.g., in response to receiving a read packet from the first or second device. In another embodiment, the switch stores the in-switch delay in a transaction delay field of the packet before forwarding the packet. For example, if the packet is a request packet, the switch may store the in-switch delay in a request delay field of the packet. If the packet is a completion packet, the switch may store the in-switch delay in a completion delay field of the packet. In one embodiment, the switch may add the in-switch delay to a value in the transaction delay field, such that the transaction delay field stores an accumulation of in-switch delays of the packet. Flow ends at block 1090.

It should be noted that in various embodiments, any of the features and techniques disclosed herein may be used in any combinations as desired.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

We claim:

1. A system, comprising:
    a master device, comprising:
        a first functional unit; and
        at least one first I/O port, coupled to the first functional unit; and
    a slave device, comprising:
        a second functional unit; and
        at least one second I/O port, coupled to the second functional unit;
    wherein the first functional unit is configured to:
        maintain a global time;
        read a first counter value of a counter of a switch coupled to the at least one first I/O port over a memory-mapped fabric;
        determine a first mapping between the global time and the counter of the switch based on the global time and the first counter value; and
        send the first mapping to the slave device via the at least one first I/O port over the memory-mapped fabric; and
    wherein the second functional unit is configured to:
        maintain a local time;
        read a second counter value of the counter of the switch coupled to the at least one second I/O port over the memory-mapped fabric;
        determine a second mapping between the local time and the counter of the switch based on the local time and the second counter value;
        receive the first mapping between the counter and the global time from the master device over the memory-mapped fabric; and
        synchronize the local time to the global time based on the first and second mappings.

2. The system of claim 1, wherein, to determine the first mapping, the master device is configured to:
    send a first request packet to the switch;
    receive a first completion packet from the switch, wherein the first completion packet comprises the first counter value of the counter; and
    determine a value of the global time corresponding to the first counter value.

3. The system of claim 2, where, to send the first mapping to the slave device, the master device is configured to:
    send a synchronization packet, wherein the synchronization packet comprises the first counter value and the value of the global time, and wherein the synchronization packet is used by the slave device to synchronize the local time of the slave device to the global time.

4. The system of claim 2, wherein the first functional unit is configured to determine the first mapping further based on one or more in-switch delays of the first request packet and one or more in-switch delays of the first completion packet.

5. The system of claim 4,
    wherein the first request packet and the first completion packet travel through one or more other switches;
    wherein the switch and the one or more other switches are configured to determine and store respective in-switch delays of the first request packet and respective in-switch delays of the first completion packet in storage elements of the switch and the one or more other switches; and wherein the master device is configured to read the stored in-switch delays by sending one or more read packets to the switch and the other switches.

6. The system of claim 4,
wherein the first completion packet comprises:
 a request delay field that stores an accumulation of in-switch delays of the first request packet; and
 a completion delay field that stores an accumulation of in-switch delays of the first completion packet.

7. The system of claim 4, wherein, to determine the value of the global time corresponding to the counter value, the first functional unit is configured to:
 calculate a one-way delay between a latching time corresponding to the counter value and a completion time corresponding to receiving the first completion packet, using an accumulated value of in-switch delays of the first request packet and an accumulated value of in-switch delays of the first completion packet to compensate for asymmetry in travel of the first request packet and the first completion packet caused by in-switch delays.

8. The system of claim 1,
wherein the master device and the slave device reside in different clock domains; and
wherein the counter of the switch corresponds to the slave device's clock domain.

9. The system of claim 1, wherein, to synchronize the local time to the global time, the slave device is configured to:
 calculate an offset by which to adjust the local time based on the first mapping and the second mapping; and
 apply the offset to the local time.

10. The system of claim 1, wherein, to determine the second mapping, the slave device is configured to:
 send a second request packet to the switch;
 receive a second completion packet from the switch, wherein the second completion packet comprises the second counter value; and
 determine a value of the local time corresponding to the second counter value.

11. The system of claim 10, wherein the second functional unit is configured to determine the second mapping further based on one or more in-switch delays of the second request packet and one or more in-switch delays of the second completion packet.

12. The system of claim 11,
wherein the second request packet and the second completion packet travel through one or more other switches;
wherein the switch and the one or more other switches are configured to determine and store respective in-switch delays of the second request packet and respective in-switch delays of the second completion packet in storage elements of the switch and the one or more other switches; and
wherein the slave device is configured to read the stored in-switch delays by sending one or more read packets to the switch and the other switches.

13. The system of claim 11,
wherein the second completion packet comprises:
 a request delay field that stores an accumulation of in-switch delays of the second request packet; and
 a completion delay field that stores an accumulation of in-switch delays of the second completion packet.

14. The system of claim 11, wherein, to determine the value of the local time corresponding to second the counter value, the second functional unit is configured to:
 calculate a one-way delay between a latching time corresponding to the second counter value and a completion time corresponding to receiving the second completion packet, using an accumulated value of in-switch delays of the second request packet and an accumulated value of in-switch delays of the second completion packet to compensate for asymmetry in travel of the second request packet and the second completion packet caused by in-switch delays.

15. The system of claim 1,
wherein the slave device and the master device reside in different clock domains; and
wherein the counter of the switch corresponds to the slave device's clock domain.

16. A method, comprising:
a master device performing:
 maintaining a global time;
 reading a first counter value of a counter of a switch coupled to the master device over a memory-mapped fabric;
 determining a first mapping between the global time and the counter of the switch based on the global time and the first counter value; and
 sending the first mapping to a slave device over the memory-mapped fabric; and
the slave device performing:
 maintaining a local time;
 wherein the switch is further coupled to the slave device over the memory-mapped fabric;
 reading a second counter value of the counter of the switch over the memory-mapped fabric;
 determining a second mapping between the local time and the counter of the switch;
 receiving the first mapping between the counter and a global time from the master device over the memory-mapped fabric; and
 synchronizing the local time to the global time based on the first and second mappings.

17. The method of claim 16, wherein said determining the first mapping comprises:
 sending a first request packet to the switch;
 receiving a first completion packet from the switch, wherein the first completion packet comprises the first counter value of the counter; and
 determining a value of the global time corresponding to the first counter value.

18. The method of claim 17, wherein said determining the first mapping is further based on one or more in-switch delays of the first request packet and one or more in-switch delays of the first completion packet.

19. The method of claim 17, wherein said determining the first mapping further comprises:
 calculating a one-way delay between a latching time corresponding to the counter value and a completion time corresponding to receiving the first completion packet, using an accumulated value of in-switch delays of the first request packet and an accumulated value of in-switch delays of the first completion packet to compensate for asymmetry in travel of the first request packet and the first completion packet caused by in-switch delays.

20. The method of claim 16,
wherein said determining the second mapping comprises:
 sending a second request packet to the switch;
 receiving a second completion packet from the switch, wherein the second completion packet comprises the second counter value of the counter; and
 determining a value of the local time corresponding to the second counter value.

21. The method of claim 20, wherein said determining the second mapping is further based on one or more in-switch delays of the second request packet and one or more in-switch delays of the second completion packet.

22. The method of claim 20, wherein said determining the second mapping comprises:

calculating a one-way delay between a latching time corresponding to the second counter value and a completion time corresponding to receiving the second completion packet, using an accumulated value of in-switch delays of the second request packet and an accumulated value of in-switch delays of the second completion packet to compensate for asymmetry in travel of the second request packet and the second completion packet caused by in-switch delays.

* * * * *